US012664365B2

(12) United States Patent     (10) Patent No.: US 12,664,365 B2
Rivain et al.     (45) Date of Patent: Jun. 23, 2026

(54) SYSTEMS AND METHODS FOR ANALYSIS OF HYPERTEXT MARKUP LANGUAGE

(71) Applicant: Dashlane SAS, Paris (FR)

(72) Inventors: Frédéric Rivain, Brooklyn, NY (US); Guillaume Maron, Paris (FR); Quentin Grail, Paris (FR); Tien Duc Cao, Seine-et-Marne (FR)

(73) Assignee: Dashlane SAS, Paris (FR)

( * ) Notice: Subject to any disclaimer, the term of this patent is extended or adjusted under 35 U.S.C. 154(b) by 118 days.

(21) Appl. No.: 18/735,711

(22) Filed: Jun. 6, 2024

(65) Prior Publication Data

US 2025/0036871 A1     Jan. 30, 2025

Related U.S. Application Data

(60) Provisional application No. 63/515,424, filed on Jul. 25, 2023.

(51) Int. Cl.
    *G06F 40/274*     (2020.01)
    *G06F 40/284*     (2020.01)
    *G06F 40/289*     (2020.01)

(52) U.S. Cl.
    CPC .......... *G06F 40/274* (2020.01); *G06F 40/284* (2020.01); *G06F 40/289* (2020.01)

(58) Field of Classification Search
    CPC .. G06F 16/3347; G06F 16/951; G06F 16/957; G06F 21/6245; G06F 40/143; G06F 40/242; G06F 40/274; G06F 40/284; G06F 40/289; G06F 40/30; G06F 3/04886; G06F 3/16; G06F 16/338; G06F 40/106; G06F 40/16; G06F 40/205; G06F 40/226; G06F 40/263; G06F 40/40; G06F 40/42; G06F 40/44; G06F 40/58; G06N 3/08; G06N 3/09; G06N 5/01; G06N 3/045; G06N 3/0455; G06N 20/00; G06Q 30/0185; G10L 15/193; G10L 15/063; G10L 15/08; G10L 15/1815; G10L 15/30
    See application file for complete search history.

(56) References Cited

U.S. PATENT DOCUMENTS

| | | | |
|---|---|---|---|
| 9,047,870 B2 * | 6/2015 | Ballinger | ................ G10L 15/30 |
| 9,348,809 B1 * | 5/2016 | Zhao | ..................... G06F 40/284 |
| 11,507,747 B2 * | 11/2022 | Kalluri | ..................... G06F 40/30 |
| 11,688,394 B1 * | 6/2023 | Filimonov | ........... G06N 3/0455 |
| | | | 704/231 |

(Continued)

*Primary Examiner* — Gerald Gauthier

(57) ABSTRACT

The present application describes systems and methods for analyzing hypertext. An element detector receives input information (e.g., hypertext) that is included in a web page. The element detector identifies one or more elements in the input information that are relevant to a classification task. The classification task may include classifying the one or more elements. An element extractor generates text tokens, positional tokens, and/or path tokens based on the identified one or more elements. A machine learning (ML) model outputs one or more vector representations based on the text tokens, positional tokens, and/or path tokens. An output classifier, which may be an additional layer of the ML model, classifies the one or more elements into classifications based on the one or more vector representations. A tool may perform one or more tasks based on the classifications.

19 Claims, 7 Drawing Sheets

(56) References Cited

U.S. PATENT DOCUMENTS

| | | | | |
|---|---|---|---|---|
| 11,704,490 B2* | 7/2023 | Sriharsha | G06F 40/242 | |
| | | | 704/9 | |
| 11,755,838 B2* | 9/2023 | Magnusson | G06N 5/04 | |
| | | | 704/9 | |
| 11,861,321 B1* | 1/2024 | O'Kelly | G06F 40/40 | |
| 12,067,364 B2* | 8/2024 | Risuleo | G06F 40/143 | |
| 12,361,736 B2* | 7/2025 | Hu | G06N 20/00 | |
| 2001/0002466 A1* | 5/2001 | Krasle | G06F 3/16 | |
| | | | 704/270.1 | |
| 2004/0054682 A1* | 3/2004 | Kano | G06F 16/957 | |
| 2004/0230912 A1* | 11/2004 | Clow | G06F 40/58 | |
| | | | 715/773 | |
| 2005/0044495 A1* | 2/2005 | Lee | G06F 40/44 | |
| | | | 715/264 | |
| 2008/0147642 A1* | 6/2008 | Leffingwell | G06F 16/951 | |
| | | | 707/999.005 | |
| 2009/0055179 A1* | 2/2009 | Cho | G10L 15/193 | |
| | | | 704/E15.003 | |
| 2014/0108991 A1* | 4/2014 | Zhai | G06F 40/284 | |
| | | | 715/773 | |
| 2015/0082229 A1* | 3/2015 | Ouyang | G06F 3/04886 | |
| | | | 715/773 | |
| 2015/0221300 A1* | 8/2015 | Sukhomlinov | G10L 15/08 | |
| | | | 704/246 | |
| 2015/0332673 A1* | 11/2015 | Li | G06F 40/30 | |
| | | | 704/235 | |
| 2015/0363791 A1* | 12/2015 | Raz | G06Q 30/0185 | |
| | | | 705/318 | |
| 2016/0188573 A1* | 6/2016 | Tang | G10L 15/1815 | |
| | | | 704/9 | |
| 2016/0275941 A1* | 9/2016 | Bellegarda | G10L 15/063 | |
| 2017/0018268 A1* | 1/2017 | Quast | G10L 15/063 | |
| 2020/0334334 A1* | 10/2020 | Keskar | G06N 3/045 | |
| 2020/0394661 A1* | 12/2020 | Raz | G06Q 30/0185 | |
| 2021/0158210 A1* | 5/2021 | Kalluri | G06F 16/3347 | |
| 2021/0209301 A1* | 7/2021 | Gupta | G06F 40/30 | |
| 2021/0271816 A1* | 9/2021 | Robert Jose | G06N 3/09 | |
| 2022/0083739 A1* | 3/2022 | Magnusson | G06N 3/09 | |
| 2022/0093088 A1* | 3/2022 | Rangarajan Sridhar | | |
| | | | G06F 16/338 | |
| 2022/0230001 A1* | 7/2022 | Johnson | G06F 40/58 | |
| 2022/0309242 A1* | 9/2022 | Glass | G06F 40/263 | |
| 2022/0343072 A1* | 10/2022 | Ogren | G06N 20/00 | |
| 2022/0382973 A1* | 12/2022 | Levit | G06F 40/226 | |
| 2023/0101746 A1* | 3/2023 | Manandise | G06F 40/16 | |
| | | | 704/9 | |
| 2023/0206125 A1* | 6/2023 | Pham | G06N 5/01 | |
| | | | 704/9 | |
| 2023/0325598 A1* | 10/2023 | Risuleo | G06F 40/143 | |
| | | | 704/9 | |
| 2023/0351143 A1* | 11/2023 | Kutt | G06F 40/205 | |
| 2023/0418971 A1* | 12/2023 | Truong | G06F 21/6245 | |
| 2024/0062003 A1* | 2/2024 | Singh | G06F 40/30 | |
| 2024/0071366 A1* | 2/2024 | Bakhturina | G06F 40/42 | |
| 2024/0211687 A1* | 6/2024 | Saeedi | G06F 40/274 | |
| 2024/0221407 A1* | 7/2024 | Hu | G06N 3/08 | |
| 2024/0311579 A1* | 9/2024 | Dong | G06F 40/284 | |
| 2024/0411983 A1* | 12/2024 | Borshevsky | G06F 40/186 | |
| 2024/0419905 A1* | 12/2024 | Mai | G06N 20/00 | |
| 2025/0036871 A1* | 1/2025 | Rivain | G06F 40/274 | |

* cited by examiner

100

Element Identifiers 301-317

300

Evolution of Training Losses
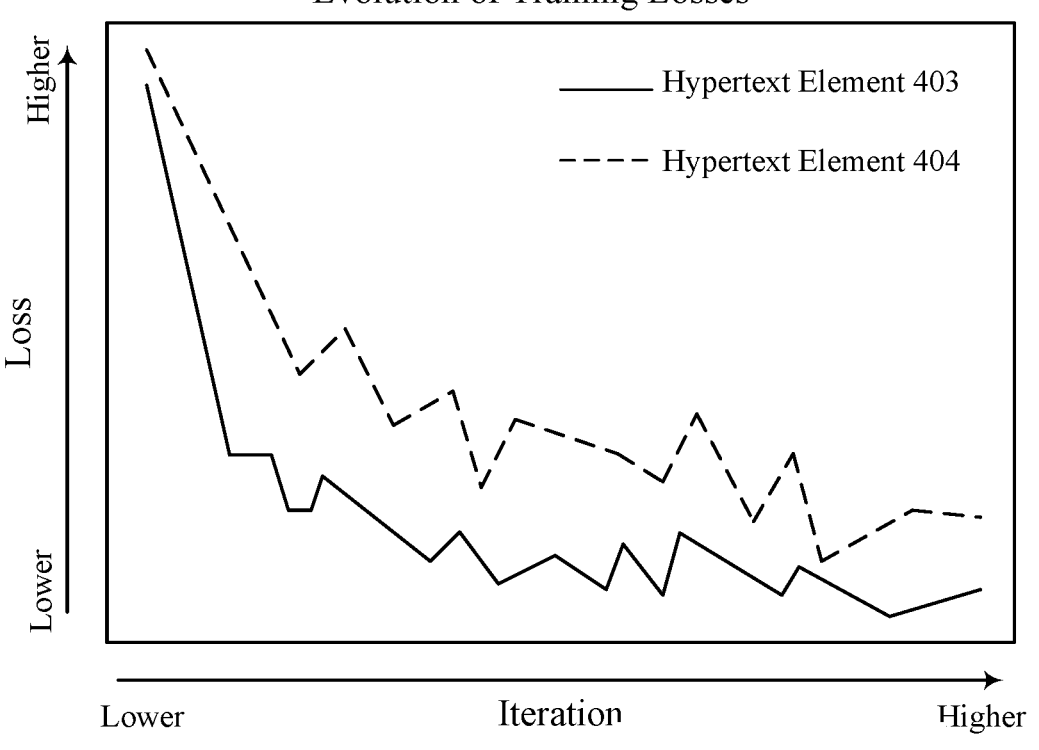
Higher
Loss
Lower
——— Hypertext Element 403
– – – Hypertext Element 404
Lower   Iteration   Higher
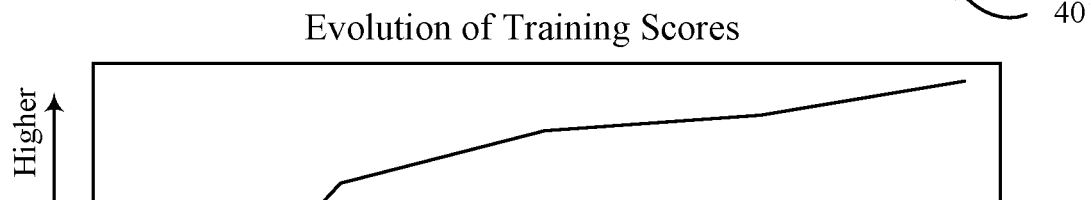
401
Evolution of Training Scores
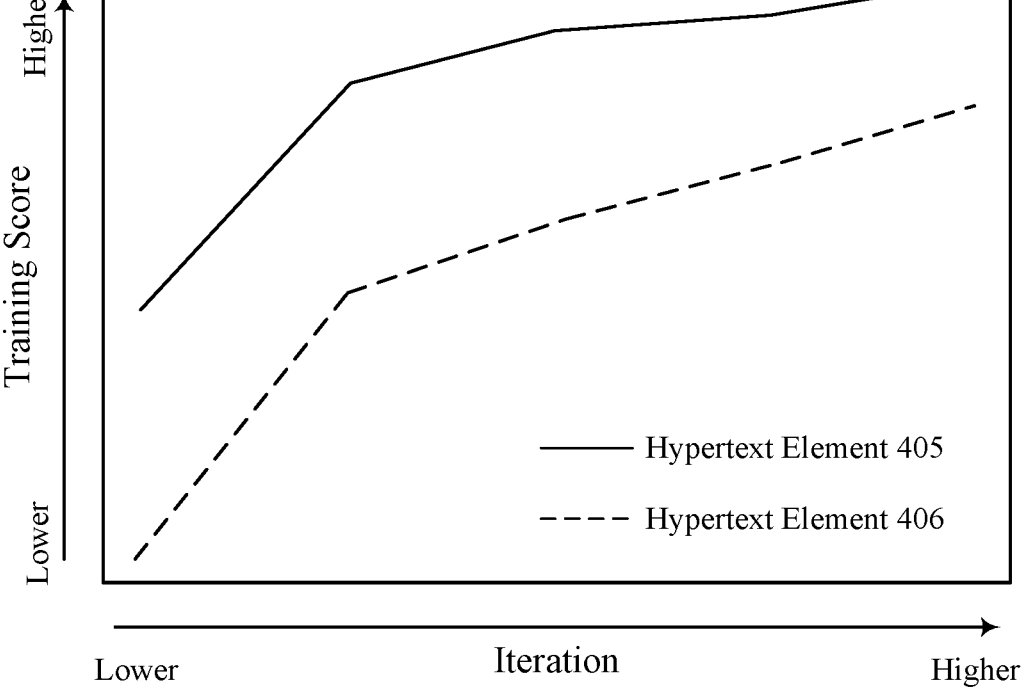
Higher
Training Score
Lower
——— Hypertext Element 405
– – – Hypertext Element 406
Lower   Iteration   Higher
FIG. 4
402

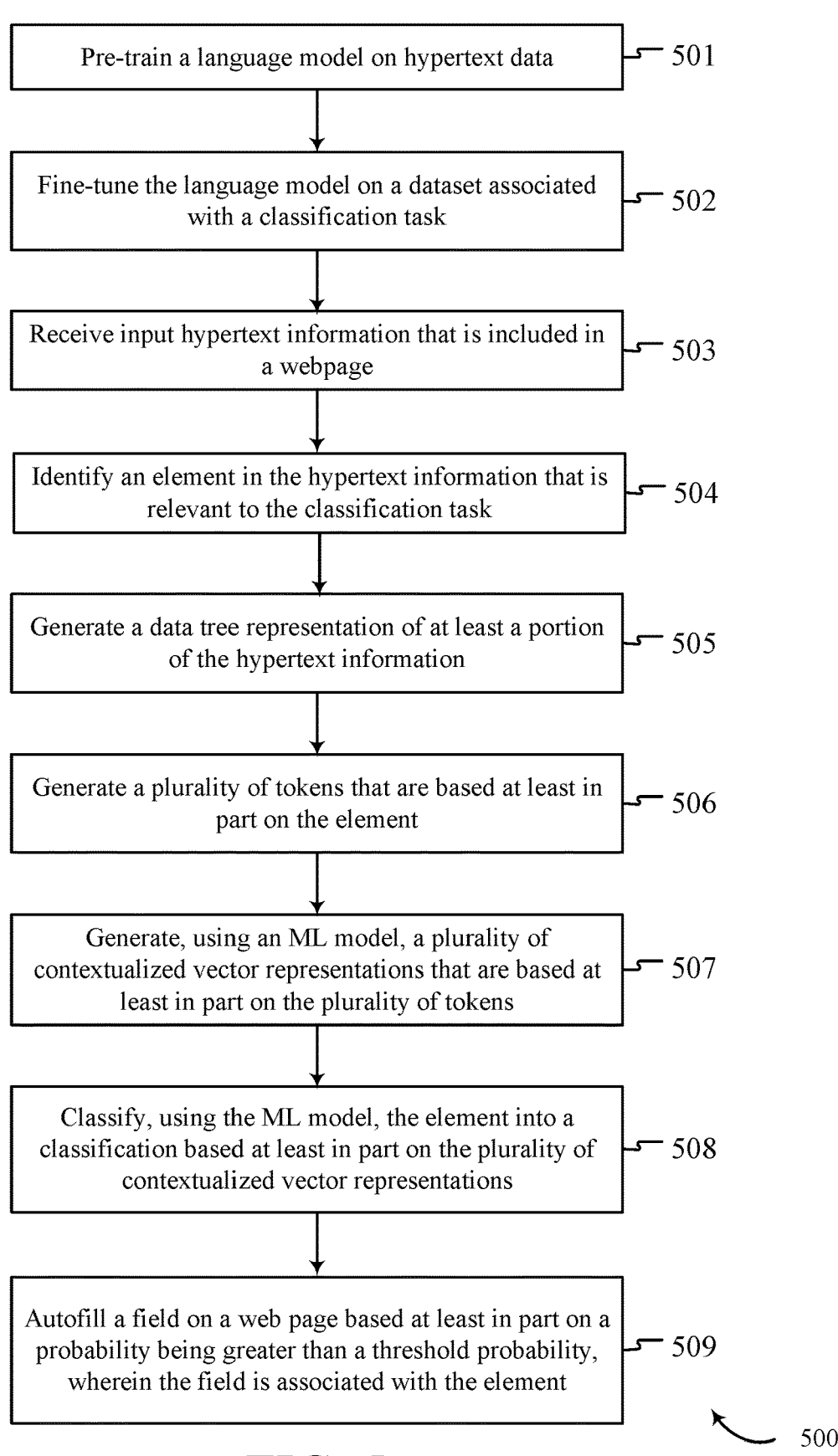

Pre-train a language model on hypertext data ᒲ— 501

Fine-tune the language model on a dataset associated with a classification task ᒲ— 502

Receive input hypertext information that is included in a webpage ᒲ— 503

Identify an element in the hypertext information that is relevant to the classification task ᒲ— 504

Generate a data tree representation of at least a portion of the hypertext information ᒲ— 505

Generate a plurality of tokens that are based at least in part on the element ᒲ— 506

Generate, using an ML model, a plurality of contextualized vector representations that are based at least in part on the plurality of tokens ᒲ— 507

Classify, using the ML model, the element into a classification based at least in part on the plurality of contextualized vector representations ᒲ— 508

Autofill a field on a web page based at least in part on a probability being greater than a threshold probability, wherein the field is associated with the element ᒲ— 509

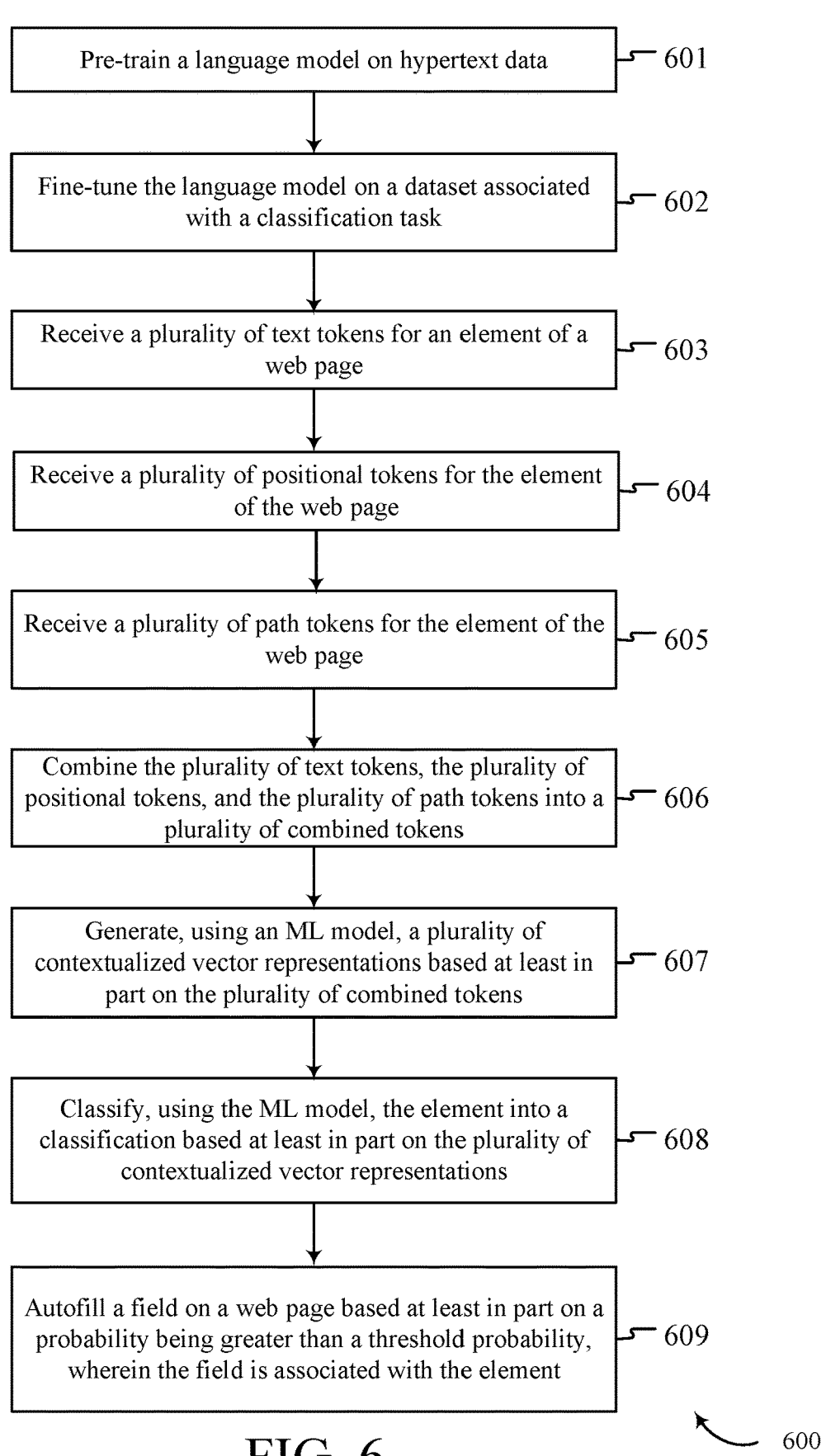

Pre-train a language model on hypertext data ⌐601

Fine-tune the language model on a dataset associated with a classification task ⌐602

Receive a plurality of text tokens for an element of a web page ⌐603

Receive a plurality of positional tokens for the element of the web page ⌐604

Receive a plurality of path tokens for the element of the web page ⌐605

Combine the plurality of text tokens, the plurality of positional tokens, and the plurality of path tokens into a plurality of combined tokens ⌐606

Generate, using an ML model, a plurality of contextualized vector representations based at least in part on the plurality of combined tokens ⌐607

Classify, using the ML model, the element into a classification based at least in part on the plurality of contextualized vector representations ⌐608

Autofill a field on a web page based at least in part on a probability being greater than a threshold probability, wherein the field is associated with the element ⌐609

SYSTEMS AND METHODS FOR ANALYSIS OF HYPERTEXT MARKUP LANGUAGE

CROSS-REFERENCE TO RELATED APPLICATIONS

This application claims the benefit of U.S. Provisional Application No. 63/515,424 filed Jul. 25, 2023, entitled "Systems and Methods for Analysis of Hypertext," which is incorporated herein by reference in its entirety.

BACKGROUND

There are various techniques to analyze hypertext in hypertext markup language (HTML) pages. For example, scanner tools may scan hypertext for key words or phrases. Different systems may use such hypertext analysis techniques for various purposes.

For example, some systems analyze hypertext to enable an automatic form-filling application ("autofiller") to fill out forms and/or fields in HTML pages. For example, an autofiller may be configured to first classify a field of a form and then automatically fill the field with stored information. Depending on the classification of the field, the autofiller may fill out some fields with stored address information, and other fields with stored credit card information, among other possibilities. Autofillers have varying levels of accuracy when classifying and filling out such forms and/or fields. It is with respect to this general technical environment that aspects of the present application are directed.

SUMMARY

The present application describes systems and methods for analysis of hypertext.

For example, aspects of the present application include a method comprising: receiving input hypertext information that is included in a web page; identifying an element in the hypertext information that is relevant to a classification task; generating a plurality of tokens that are based at least in part on the element; generating, using a machine learning (ML) model, a plurality of contextualized vector representations that are based at least in part on the plurality of tokens; and classifying, using the ML model, the element into a classification based at least in part on the plurality of contextualized vector representations.

In some examples, the ML model is a language model, the method further comprising: pre-training the language model on hypertext data; and fine-tuning the language model on a dataset associated with the classification task. In some examples, the method further comprises: generating a data tree representation of at least a portion of the hypertext information, wherein generating the plurality of tokens is based at least in part on the data tree representation. In some examples, the plurality of tokens comprises text tokens, positional tokens, and path tokens. In some examples, classifying the element comprises generating a probability that the element is associated with the classification. In some examples, the method further comprises autofilling a field on a web page based at least in part on the probability being greater than a threshold probability, wherein the field is associated with the element. In some examples, the element is one of a form or a field on the web page.

In another example, aspects of the present application include a method, comprising: receiving a plurality of text tokens for an element of a web page; receiving a plurality of positional tokens for the element of the web page; receiving a plurality of path tokens for the element of the web page; combining the plurality of text tokens, the plurality of positional tokens, and the plurality of path tokens into a plurality of combined tokens; generating, using an ML model, a plurality of contextualized vector representations based at least in part on the plurality of combined tokens; and classifying, using an output classifier, the element into a classification based at least in part on the plurality of contextualized vector representations.

In some examples, classifying the element comprises applying, at an output layer of the ML model, a classifier to a contextualized vector representation, and generating, at the output layer of the ML model, a probability that each token of the contextualized vector representation corresponding to an HTML element such as a form or a field is associated with the classification based at least in part on the applying. In some examples, a type of the classifier applied is based at least in part on a type of the element. In some examples, the method further comprises: autofilling a field on a web page based at least in part on the probability being greater than a threshold probability, wherein the field is associated with the element. In some examples, the ML model is a language model, and the method further comprises: pre-training the language model on hypertext data; and fine-tuning the language model on a dataset associated with the classification task. In some examples, the element is one of a form or a field on the web page.

In another example, aspects of the present application include a system comprising: a processor; and memory comprising executable instructions that when executed, perform operations, the operations comprising: receiving input hypertext information that is included in a web page; identifying an element in the hypertext information that is relevant to a classification task; generating a plurality of tokens that are based at least in part on the element; generating, using an ML model, a plurality of contextualized vector representations that are based at least in part on the plurality of tokens; and classifying, using the ML model, the element into a classification based at least in part on the plurality of contextualized vector representations.

In some examples, the ML model is a language model, and the operations further comprise: pre-training the language model on hypertext data; and fine-tuning the language model on a dataset associated with the classification task. In some examples, the operations further comprise: generating a data tree representation of at least a portion of the hypertext information, wherein generating the plurality of tokens is based at least in part on the data tree representation. In some examples, the plurality of tokens comprises text tokens, positional tokens, and path tokens. In some examples, classifying the element comprises generating a probability that the element is associated with the classification. In some examples, the operations further comprise autofilling a field on a web page based at least in part on the probability being greater than a threshold probability, wherein the field is associated with the element. In some examples, the element is one of a form or a field on the web page.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4 is a chart depicting model training data according to aspects of the present application.

FIG. 5 is a flowchart depicting an example method according to aspects of the present application.

FIG. 6 is a flowchart depicting an example method according to aspects of the present application.

DETAILED DESCRIPTION

Figure 1:
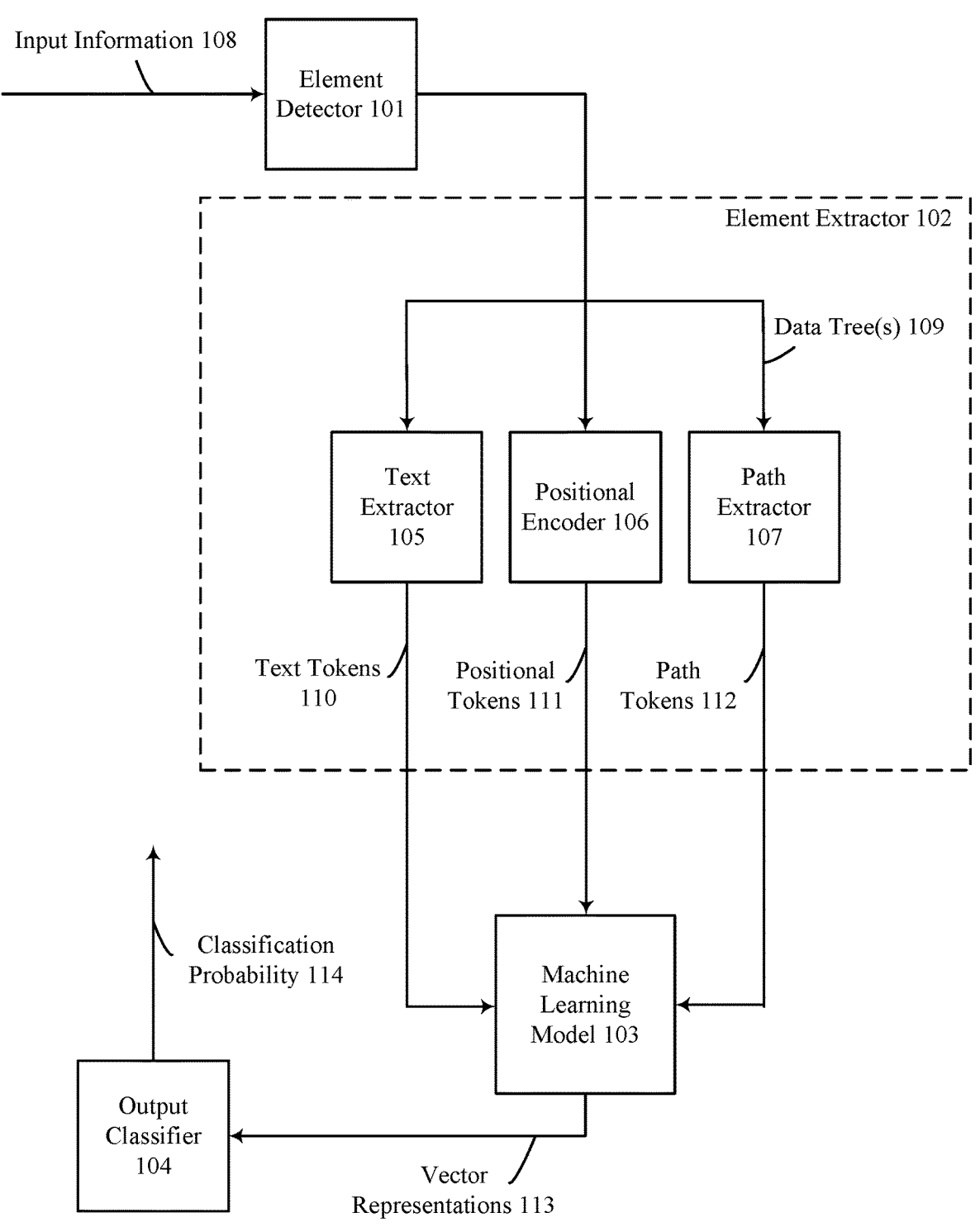
FIG. 1 is a block diagram depicting an example system according to aspects of the present application.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

There are various techniques to analyze hypertext in, for example, hypertext markup language (HTML) pages. For example, scanner tools may scan hypertext for key words or phrases. Different systems may use such hypertext analysis techniques for various purposes. For example, some systems analyze hypertext to enable autofillers to fill out forms and/or fields in web pages. For example, an autofiller may (a) classify the fields, and then (b) depending on the classification, fill out some fields with stored address information, and other fields with stored credit card information, among other possibilities. Autofillers have varying levels of accuracy when classifying and filling out such forms and/or fields. Thus, improved systems and methods for analyzing hypertext to, for example, more accurately and efficiently represent hypertext elements of a web page may be utilized by various tools, including autofillers.

Examples of present systems and methods may provide pre-trained machine learning (ML) models (e.g., language models) to overcome various limitations when analyzing hypertext (e.g., HTML). For example, while some ML models may be adapted to process raw HTML files, such ML models may be limited in their utility in performing particular tasks, for example, form and field analysis and autofill. Presently disclosed systems and methods provide ML models that process visible elements of a web page (e.g., forms and fields), non-visible elements (e.g., forms and fields) of a web page, or both. Such elements are useful to consider for certain applications that rely on accurate classifications of forms and/or fields, such as autofill applications. Additionally, presently improved systems and methods provide for fine-tuned ML models including extending the model with one or several layers configured to output element classifications, categorizations, or classes (collectively, "classifications") and/or their probabilities based on vector representations, which is useful for certain applications including autofill applications.

Figure 2:
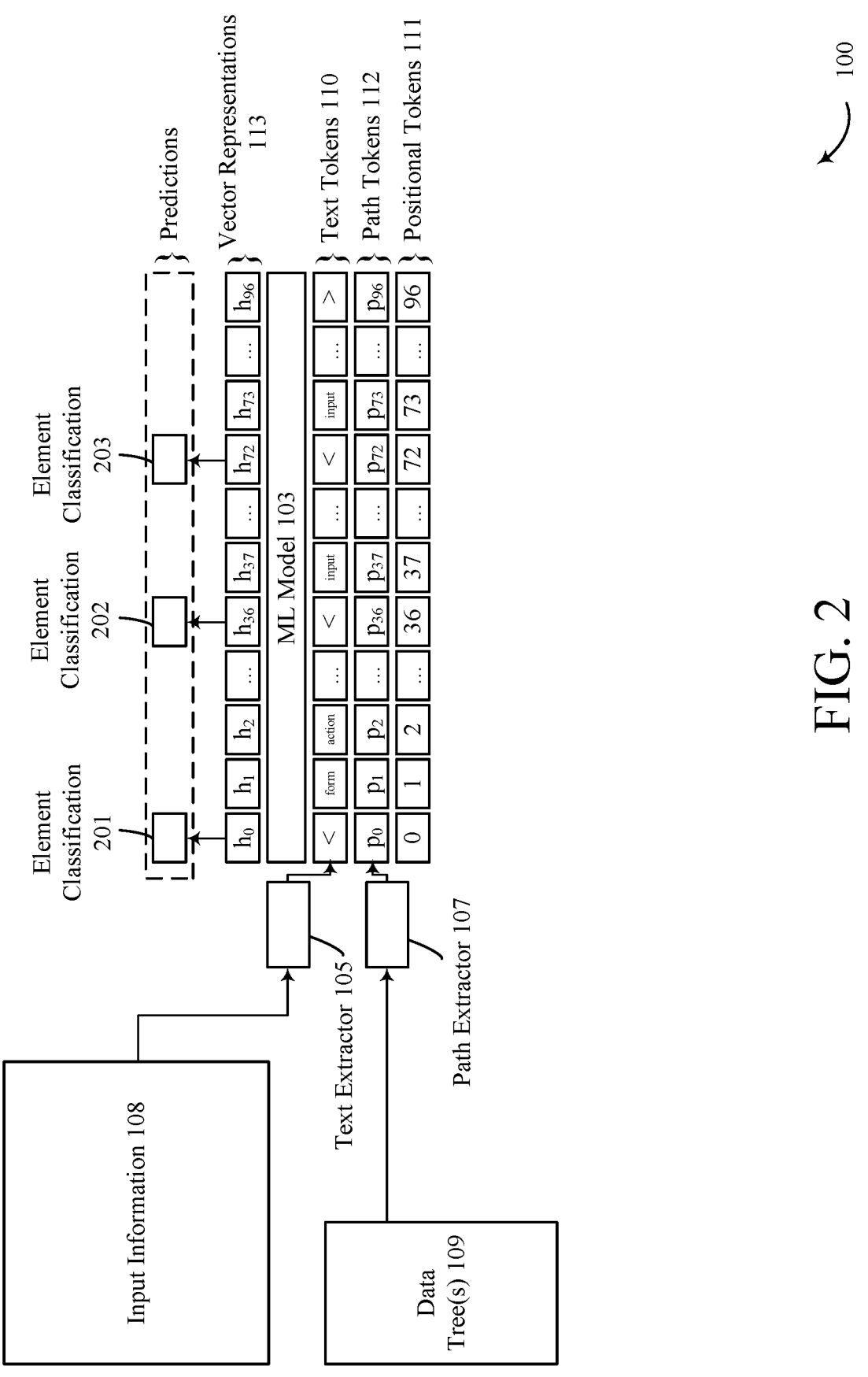
FIG. 2 is a block diagram depicting an example system according to aspects of the present application.

FIG. 1 depicts an example system 100 according to aspects of the present disclosure. FIG. 2 depicts a more-detailed representation of certain aspects of system 100. Some aspects of FIG. 1 may be omitted from FIG. 2 for illustrative brevity. Concurrently referring to FIGS. 1 and 2, system 100 provides an efficient and accurate way to represent hypertext elements of a web page. System 100 includes element detector 101, element extractor 102, ML model 103, and output classifier 104. Element extractor 102 includes text extractor 105, positional encoder 106, and path extractor 107. In some examples, the ML model may include a transformer.

Element detector 101 receives input information 108 that is included in a web page. In some examples, element detector 101 receives the web page, or a portion of the web page (e.g., input information 108 includes the web page). For example, element detector 101 receives input hypertext (e.g., HTML) information that is included in a web page (e.g., an HTML page or document). In some examples, element detector 101 receives the HTML page or document, or a portion of the HTML page or document. Input information 108 may include one or more hypertext elements.

Element detector 101 identifies one or more elements in input information 108 (e.g., HTML information) that are relevant to a classification task. For example, element detector 101 identifies forms and/or fields in the web page information (e.g., in the HTML information). Elements (e.g., HTML elements) of a web page may include fields, forms, or both, among other elements. Forms may represent the context of fields. A form may include one or more fields. The classification task may refer to classifying one or more elements (e.g., forms and/or fields) of input information 108. For example, the classification task may include determining whether a field or form is likely to be of a particular classification. In nonexclusive examples, classifications for fields may include action, address, age, company, consent, date, email, id_document, name, other, otp, password, payment, phone, query, title, username, or website, among other examples. Classifications for forms may include billing, change_password, contact, forgot_password, identity, login, newsletter, other, payment, register, search, shopping_basket, or shipping, among other examples. Element detector 101 may identify the hypertext elements that are relevant to particular classification tasks by searching for key words or key elements in input information 108. For example, to identify forms on a web page, the element detector 101 may detect the HTML elements <form>, and to identify fields on the web page, the system may detect the HTML element <input>. Whether an element is relevant to a classification task may be determined by determining if the key word or key element in input information 108 matches a predetermined element type for desired classification (e.g., forms and/or fields, such as <form> or <input>), which may be indicated by a user or by another component. Element detector 101 provides the identified one or more elements that are relevant to the classification task to element extractor 102 (e.g., text extractor 105, positional encoder 106, and/or path extractor 107). An element (e.g., HTML element) may be defined as information from a start tag (e.g., <form>) to an end tag (e.g., </form>). For example, element detector 101 may provide:

```
<input type="text" name="email"/>
``` to element extractor 102, since the identified element (e.g., identified by "input") includes the information from < to />. In some other examples, element detector 101 may provide:

```
<form action="signin_confirm.html" method="GET">
    <div class="field">
        <span>Email</span>
        <input type="text" name="email"/>
    </div>
    <div class="field">
        <span>Password</span>
        <input type="password" name="password"/>
    </div>
</form>
``` to element extractor 102, since the identified element (e.g., identified by "form") includes the information from <form action="signin_confirm.html" method="GET"> to </form>.

In some examples, element detector 101 may provide at least one or more of the identified elements that are relevant to the classification task in the form of data tree 109 (e.g., a document object model (DOM) tree). A data tree is a hierarchical representation of a web document (e.g., HTML document). In some examples, a data tree includes a root node, which is associated with the document itself, and one or more child nodes that represent the elements, attributes, and text content of the document. Each element may be associated with an object and a node in the data tree. Elements may have sub-elements, which are children nodes of the elements. For example, the <html> element may be the root node, which may have two children nodes: <head> and <body>. Each element may also be associated with attributes, such as id, class, style, etc., which are also nodes in the data tree. Text nodes are nodes that include a string of text. Text nodes may be leaf nodes, which may have no child nodes. Text nodes include text content. In some examples, element detector 101 may provide data tree(s) 109 for at least one of the one or more elements provided to element extractor 102. For example, element detector 101 may provide a data tree representation of a form, and another data tree representation of another form. Child nodes of a form data tree may include nodes for fields, other forms, or both. Field nodes may be text nodes of a data tree in some examples.

Element extractor 102 may receive one or more elements (e.g., HTML elements) from element detector 101 (e.g., in the form of data tree(s) 109, for example, DOM tree(s)). Element extractor 102 extracts information from the one or more elements identified by element detector 101 that is useful for the classification task (e.g., classifying the hypertext elements). For example, element extractor 102 may generate text tokens 110, positional tokens 111, and/or path tokens 112 based on the one or more elements (e.g., in data tree(s) 109) identified by element detector 101. Element extractor 102 may include one or more pre-trained tokenizers to tokenize one or more (e.g., each) nodes of each data tree(s) 109. For example, element extractor may include text extractor 105, positional encoder 106, and path extractor 107 to generate text tokens 110, positional tokens 111, and path tokens 112, respectively, for one or more (e.g., each) nodes in data tree(s) 109.

In some examples, text extractor 105 generates text tokens 110 for one or more (e.g., each) nodes in data tree(s) 109 (e.g., where nodes in the data tree(s) 109 correspond to elements). Text tokens are units of text including words, portions of words, letters, characters, phrases, symbols, or a combination of these. In some examples, text extractor 105 additionally or alternatively receives at least a portion of input information 108 to generate text tokens 110. For example, text extractor 105 may receive a portion of input information 108 that corresponds to the one or more elements identified by element detector 101. For example, if element detector 101 identifies a form, text extractor 105 may receive the hypertext of the entire form (e.g., including any fields included in the form), and may additionally receive other contextual information for the form (e.g., other hypertext in input information 108). Text extractor 105 may transform the hypertext of the one or more elements identified by element detector 101 into one or more sequences of one or more tokens adapted to ML models (e.g., ML model 103). Text extractor 105 may provide text tokens 110 as a list or a set to ML model 103. ML model 103 may expect to receive text data (e.g., text tokens 110) in a given format, for example, a numerical vector or a sequence of tokens, to process the text data effectively. Thus, text extractor 105 may transform received text data (e.g., hypertext data of elements in data tree(s) 109 and/or input information 108) into a suitable format for ML model 103. For example, the HTML element:

```
<form action="signin_confirm.HTML" method="GET">
    <div class="field">
        <span>Email</span>
        <input type="text" name="email"/>
    </div>
    <div class="field">
        <span>Password</span>
        <input type="password" name="password"/>
    </div>
</form>
``` may be transformed into the following sequence of tokens:

(Equation 1)

$$Text = \left[ \text{'} < \text{'}, \text{'form'}, \text{'action'}, \text{'} = \text{'}, \text{''''}, \text{'sign'}, \text{'in'}, \text{'\_'}, \text{'confirm'}, \text{'.'}, \right.$$

$$\text{'HTML'}, \text{''''}, \text{'method'}, \text{'} = \text{'}, \text{''''}, \text{'GE'}, \text{'T'}, \text{''''}, \text{'} > \text{'}, \text{'} < \text{'}, \text{'di'}, \text{'v'},$$

$$\text{'class'}, \text{'} = \text{'}, \text{''''}, \text{'field'}, \text{''''}, \text{'} > \text{'}, \text{'} < \text{'}, \text{'span'}, \text{'} > \text{'}, \text{'EM'}, \text{'ail'}, \text{'} < \text{'},$$

$$\text{'} / \text{'}, \text{'span'}, \text{'} > \text{'}, \text{'} < \text{'}, \text{'input'}, \text{'type'}, \text{'} = \text{'}, \text{''''}, \text{'text'}, \text{'name'}, \text{'} = \text{'}, \text{''''},$$

$$\text{'email'}, \text{''''}, \text{'} / \text{'}, \text{'} > \text{'}, \text{'} < \text{'}, \text{'} / \text{'}, \text{'di'}, \text{'v'}, \text{'} > \text{'}, \text{'} < \text{'}, \text{'di'}, \text{'v'}, \text{'class'},$$

$$\text{'} = \text{'}, \text{''''}, \text{'field'}, \text{''''}, \text{'} > \text{'}, \text{'} < \text{'}, \text{'span'}, \text{'} > \text{'}, \text{'Pass'}, \text{'word'}, \text{'} < \text{'}, \text{'} / \text{'},$$

$$\text{'span'}, \text{'} > \text{'}, \text{'} < \text{'}, \text{'input'}, \text{'type'}, \text{'} = \text{'}, \text{''''}, \text{'password'}, \text{''''}, \text{'name'}, \text{'} = \text{'},$$

$$\left. \text{'password'}, \text{''''}, \text{'} / \text{'}, \text{'} > \text{'}, \text{'} < \text{'}, \text{'} / \text{'}, \text{'di'}, \text{'v'}, \text{'} > \text{'}, \text{'} < \text{'}, \text{'} / \text{'}, \text{'form'}, \text{'} > \text{'} \right]$$

In some cases, ML model 103 may accept a limited number of tokens due to memory constraints. Thus, text extractor 105 may select a restricted number of nodes from a given data tree 109 (e.g., a restricted number of nodes of a given form). For example, text extractor 105 may first select field nodes representative of fields of the form represented by the given data tree 109, and then incrementally include as much context as possible until reaching, or just before reaching, the limited number of tokens acceptable to be input to ML model 103. In some examples, the number of tokens acceptable to ML model 103 may be 512 tokens, or any other quantity of tokens.

Positional encoder 106 may associate each input text token (e.g., text tokens 110) with its relative position in the sequence of text tokens 110 provided to ML model 103. Positional encoder 106 may provide positional tokens 111 as a list or a set. Those positional tokens may be called position embeddings. The number of positional tokens 111 may be the same number as text tokens 110 and path tokens 112. For example, positional encoder 106 may provide positional tokens 111 as:

$$Position = [0, 1, 2, \dots , 96] \qquad \text{(Equation 2)}$$

Path extractor 107 (e.g., an XML Path Language (XPath) extractor) generates, for each text token 110, a sequence that represents the text token 110's position in the data tree 109. For example, in the sequence generated by path extractor 107, each item may represent a path through the data tree 109 or hypertext (e.g., HTML) page or document corresponding to the input token's position. Each item in the sequence may be a relative path expression indicating the position of the element relative to other elements. For example, a path expression of "body/div/form/input" may indicate that the input element is a child of the form element which is a child of the div element which is a child of the body element. The position of each item in the sequence generated by path extractor 107 may correspond to the associated input text token's position in the sequence of text tokens. For example, the third text token in the sequence of text tokens generated by text extractor 105 may correspond to the third item in the sequence generated by path extractor 107. Path extractor 107 may provide path tokens 112 as a list or a set. An example sequence generated by path extractor 107 may be:

$$\text{(Equation 3)}$$
$$XPath = [body/div/form, body/div/form, \dots ,$$
$$body/div/form/span, \dots body/div/form/input, \dots]$$

Element extractor 102 combines (e.g., adds, sums, concatenates) text tokens 110, positional tokens 111 and path tokens 112 to create a sequence of combined tokens. ML model 103 may be a language model (e.g., a large language model). ML model 103 may be pre-trained to analyze hypertext (e.g., pre-trained on HTML information). Pre-training and fine-tuning of ML model 103 will be discussed in further detail in FIGS. 3 and/or 4.

ML model 103 outputs one or more vector representations 113 (e.g., in a list or set), where each vector representation 113, at the position in the list or set of vector representations 113, is a numerical representation of text tokens 110 at the respective position in the list or set of text tokens 110, contextualized by at least a portion of the web page (e.g., some or all of text tokens 110, positional tokens 111, and/or path tokens 112). In some examples, the one or more vector representations 113 may be referred to as embeddings (e.g., HTML embeddings). In some examples, the output of ML model 103 (e.g., the number of the one or more vector representations 113) is the same size as the number of text tokens 110 (e.g., each vector representation 113 represents one token of text). For example, ML model may output:

$$Output = [h_0, h_1, \dots , h_i, \dots , h_{96}] \qquad \text{(Equation 4)}$$

where $h_0$ is the first vector representation, $h_1$ is the second vector representation, and $h_{96}$ is the last vector representation. In some examples, each vector representation's location in the list or set of vector representations 113 corresponds to the same location in the list or set of text tokens 110, positional tokens 111, and/or path tokens 112. For example, item $h_1$ (e.g., the second vector representation) may be a vector representation for the second text token 110 (e.g., "form" in FIG. 2).

Output classifier 104 classifies hypertext elements into classifications based on the one or more vector representations 113. Output classifier 104 may be an output layer of ML model 103. In some examples, output classifier 104 of ML model 103 classifies one or more (e.g., each) elements identified by element detector 101. Output classifier 104 applies output classifiers to the vector representations 113 that correspond to the positions of the hypertext (e.g., HTML) or hypertext tags for the elements (e.g., form and fields) being classified in the web page. For example, in FIG. 2, output classifier 104 applies output classifiers to vector representations $h_0$, $h_{36}$, and $h_{72}$. In some examples, the applied classifiers include linear transformations followed by a non linear activation function (e.g. softmax). Applying the classifiers may result in output probabilities of a given vector representation for one or more (e.g., each) classification. Output classifier 104 may provide one or more output classification probabilities 114 (e.g., probabilities for each classification) for one or more (e.g., each) vector representation of vector representations 113 (e.g., where the vector representation corresponds to an identified element by element detector 101). For example, output classifier 104 may determine that vector representation $h_0$ (e.g., identified as corresponding to an element, for example, a form, by element detector 101) has a classification probability of a "billing" of 0.75, and a probability of "payment" of 0.15. In some examples, if a classification probability of a given element for a given classification is greater than a threshold probability and/or if classification probability 114 of the given element for the given classification is the highest probability among the possible classifications, output classifier 104 may classify the given element as the given classification. For example, output classifier 104 may classify the element corresponding to vector representation $h_0$ as element classification 201, classify the element corresponding to vector representation $h_{36}$ as element classification 202, and classify the element corresponding to vector representation $h_{72}$ as element classification 203. Element classes 201 and/or 202 and/or 203 may refer to classifications including, for forms, billing, change_password, contact, forgot_password, identity, login, newsletter, other, payment, register, search, shopping_basket, or shipping, among other examples. For fields, element classes 201 and/or 202 and/or 203 may refer to classifications including action, address, age, company, consent, date, email, id_document, name, other, otp, password, payment, phone, query, title, username, or website, among other examples.

In some examples, output classifier 104 may additionally or alternatively output the actual element classification for a given hypertext element that has a classification probability that is a) the highest among the probabilities for the various element classifications and/or b) above a threshold probability.

In some examples, another component or tool (e.g., an autofiller) may perform a task based on the probabilities of various elements being particular classifications and/or based on the classifications for given hypertext elements as determined by output classifier 104. For example, if classification probability 114 for an element being a given classification is greater than a threshold probability and/or if classification probability 114 for the element being the given classification is the highest probability among the possible classes that the element could be, the component or tool may perform the task (e.g., an autofiller may autofill the element on the web page with relevant information to the classification). In another example, if output classifier 104 provides an indication that the classification of the element corresponding to vector representation $h_0$ is likely a given classification, the component or tool may perform the task (e.g., an autofiller may autofill the element on the web page with relevant information to the classification). In some examples, multiple different classifiers may be used for each vector representation or element. For example, output classifier 104 may apply a first classifier to a first vector representation specific for classifying forms (e.g., if the vector representation is associated with a form element as identified by element detector 101), and may apply a second, different classifier to a second vector representation specific for classifying fields (e.g., if the vector representation is associated with a field element as identified by element detector 101). For example, in FIG. 2, output classifier 104 may apply a form-specific classifier to vector representation $h_0$ and a field-specific classifier to vector representation $h_{36}$.

Other applications for presently disclosed systems and methods that accurately and efficiently identify hypertext elements are contemplated. For example, without knowing whether a user has logged in or is having trouble logging in, password manager applications might propose ineffective actions such as asking users to update/replace their password. Systems and methods disclosed herein may be used to fine-tune hypertext (e.g., HTML) embeddings to predict a current login status (e.g., "successfully logged in", "failed to login") to help the password manager make better suggestions. For example, a method may include annotating a labeled dataset of relevant elements in a web page (e.g., footer, header, side bar) that may indicate a login status of a user (e.g., whether the user has logged in or not logged in). Similar operations illustrated in FIG. 1 may be applicable, however, element detector 101 may detect relevant hypertext (e.g., HTML) elements (e.g., user profile elements, login elements, password box elements, username elements, failed password elements) indicating whether or not the user has logged in or has failed to login, rather than forms/fields. In some examples, output classifier 104 may be trained with hypertext data including elements corresponding to different classifications—logged in, and not logged in, for example.

Other applications for presently disclosed systems and methods that accurately and efficiently identify hypertext elements are also contemplated. By fine-tuning a web page's content with a labeled dataset of phishing and legitimate websites, systems and methods could be used to predict whether a given web page is likely to be a phishing/malicious web page. For example, a similar method discussed above may be applied, but where the method includes detecting form elements by element detector 101, and where output classifier 104 may be trained with hypertext data including elements corresponding to different classifications—(a) phishing and (b) legitimate, for example.

Other applications for presently disclosed systems and methods that accurately and efficiently identify hypertext elements are also contemplated. For example, rather than outputting probabilities of different hypertext elements, system 100 may provide hypertext (e.g., HTML) code as output based on the analysis of input information 108. In such examples, input information 108 may include textual descriptions or instructions (e.g., natural language), and system 100 may be able to predict appropriate hypertext tags, attributes, values, and the like based on input information 108 to match an intended output. For example, element detector 101 may be able to determine hypertext elements to include in the output based on the natural language in input information 108. In some examples, system 100 may be able to generate valid HTML pages that include login forms.

Figure 3:
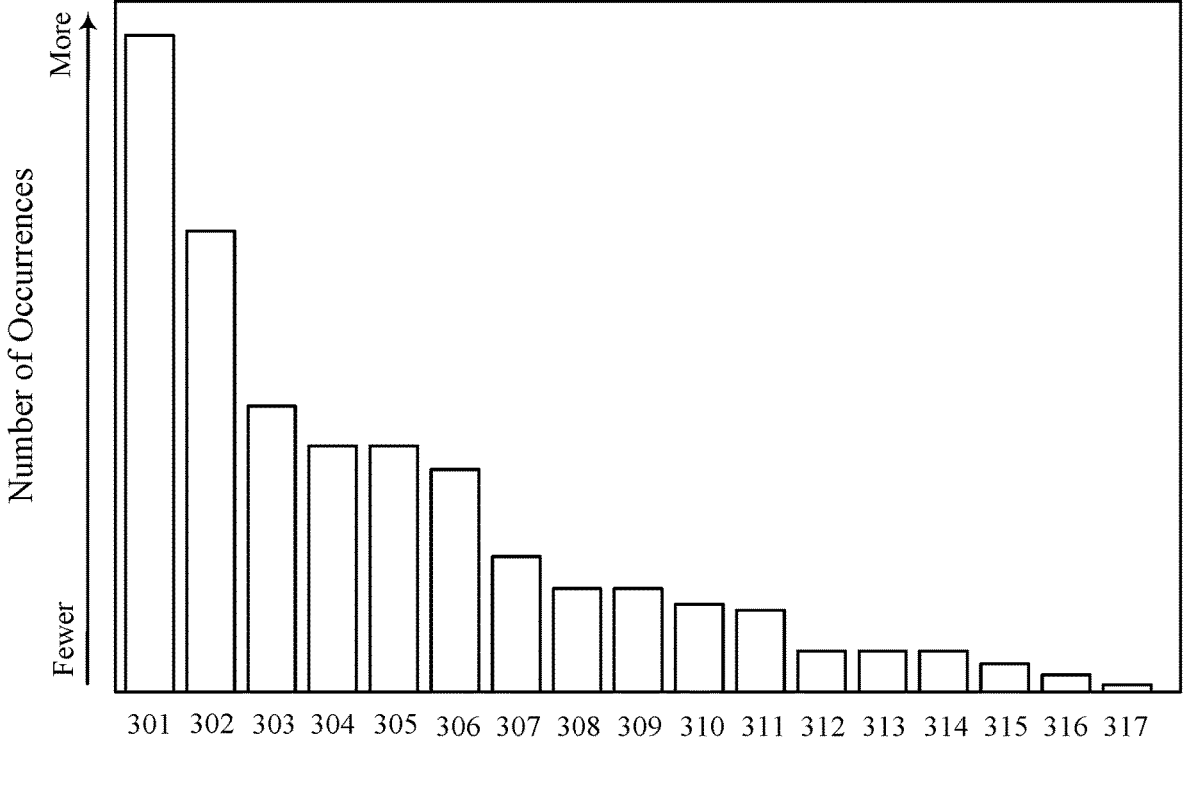
FIG. 3 is a chart depicting a distribution of element identifiers for classification according to aspects of the present application.

FIG. 3 discloses a chart 300 depicting a distribution of element identifiers 301-317 according to aspects of the present application. The particular illustrations of data in chart 300 are examples, and the present disclosure is not intended to be limited to the particular depictions in FIG. 3. For example, FIG. 3 may describe the distribution of field identifiers or form identifiers. For example, if FIG. 3 illustrates the distribution of form identifiers, examples of identifiers 301-317 may include "login" for identifier 301, "register" for identifier 302, "forgot_password" for identifier 303, "other" for identifier 304, "identity" for identifier 305, and the like. In another example, if FIG. 3 illustrates the distribution of field identifiers, examples of identifiers 301-317 may include "other" for identifier 301, "action" for identifier 302, "password" for identifier 303, "email" for identifier 304, "address" for identifier 305, and the like. FIG. 3 illustrates, e.g., that some element identifiers are more common than others.

FIG. 4 discloses charts 401 and 402 depicting model training data according to aspects of the present application. Charts 401 and 402 may depict the results of training ML model 103, output classifier 104, or both. Charts 401 and 402 illustrate non-limiting example data. The particular illustrations of data in charts 401 and 402 are examples, and the present disclosure is not intended to be limited to the particular depictions in FIG. 4.

ML model 103, output classifier 104, or both, may be pre-trained on hypertext data. Such pre-training involves teaching an algorithm to learn patterns from the hypertext data. In some examples, the pre-training includes collecting and preparing a dataset. In non-exclusive examples, the dataset may include one or more web pages, such as raw HTML web pages (e.g., on the order of tens, hundreds, thousands, tens of thousands, hundreds of thousands, or millions of web pages) with comments or labels to indicate which cascading style sheets (CSS) selectors may be used, or what CSS rules are applicable. The dataset may include a training set and a test set. The training set may be used to train ML model 103, output classifier 104, or both, while the test set may be used to evaluate a performance of ML model 103, output classifier 104, or both. The algorithm may iteratively make predictions on the training data and is corrected by adjusting model parameters. This process may be guided by a loss function, which quantifies how far the predictions deviate from the actual values from the training data. A goal of training is to minimize the loss function (e.g., a cross entropy loss function), which is successfully displayed in FIG. 4. Chart 401 illustrates training losses for hypertext element classifiers (e.g., as utilized by output classifier 104). Chart 401 illustrates a downward trend of training losses for different hypertext elements across training iterations. Chart 401 illustrates that losses reduce with increased number of iterations in training. In some examples, losses reduce substantially logarithmically. In some examples, the iterations depicted on the horizontal axis of chart 401 are on the order of $10^3$, and the losses depicted on the vertical axis of chart 401 are on the order of $10^0$ (e.g., 0.5, 1.0, 1.5, 2.0). In some examples, hypertext element 403 is fields, and hypertext element 404 is forms. Performance of ML model 103, output classifier 104, or both may be evaluated on the test set. ML model 103, output classifier 104, or both, may be language models. Large Language Models (LLMs) are a type of language model typically characterized by their extensive size and are trained on large corpora of text data. Language models are statistical models designed to analyze and understand human language. In training language models, the input may include a sequence of words, and the output may include the probability distribution of word sequences. A language model may predict the categories or labels associated with the input words. ML model 103, output classifier 104, or both may be transformer-based models (e.g., transformers). In some examples, transformers use self-attention mechanisms to capture dependencies between words, regardless of their distance in the sequence of one or more words.

In some examples, training ML model 103, training output classifier 104, or training both on HTML web pages includes one or more additional preprocessing steps. For example, ML model 103, output classifier 104, or both may learn to understand the structure of a web page from HTML tags, which may provide additional context that helps in making predictions. For example, hypertext included in or associated with (e.g., in-line with, included within the element corresponding to) form or field tags (e.g., <form>, <input>) may be given more weight than other tags.

An F1 score may be used to evaluate ML model 103, output classifier 104, or both, on each classification, and a weighted F1 score may be used to evaluate the global performance of some or all of the dataset of ML model 103, output classifier 104, or both. ML model 103, output classifier 104, or both, or another component may determine the F1 score and/or the weighted F1 score. The F1 score may be a measure of a model's performance that considers both precision (how many of the predicted positive instances are actually positive) and recall (how many of the actual positive instances are predicted positive). The F1 score may be the harmonic mean of precision and recall and may range from 0 (worst) to 1 (best). The F1 score may be used to evaluate the model's ability to correctly predict a classification of hypertext (e.g., HTML) elements (e.g., forms and/or fields). Chart 402 illustrates an upward trend of training scores (e.g., F1 scores or weighted F1 scores) for different hypertext elements across training iterations. Chart 402 illustrates that training scores increase with increased number of iterations in training. In some examples, training scores increase substantially logarithmically. In some examples, the iterations depicted on the horizontal axis of chart 402 are on the order of $10^3$, and the training scores depicted on the vertical axis of chart 401 are on the order of $10^{-1}$ (e.g., 0.5, 0.6, 0.7, 0.8, 0.9). In some examples, hypertext element 405 is fields, and hypertext element 406 is forms.

Various libraries and/or models may be used to train output classifier 104 according to present systems and methods. In some examples, output classifier 104 may be trained for one or more (e.g., 2) epochs using an optimizer with a slow or fast learning rate (e.g., 0.01) and cross entropy loss. The learning rate may dictate how much parameters are changed in each iteration. Cross entropy loss may be a specific type of loss function that measures the difference between two probability distributions, for example, the true distribution and the predicted distribution by ML model 103, output classifier 104, or both, of the likelihoods of each hypertext element belonging to each classification (e.g., distributions of probabilities). In some examples, for binary classification where there are two classifications, the cross entropy loss may be known as the binary cross entropy loss. For multi-class classification where there are more than two classes, the cross entropy loss may be known as the categorical cross entropy loss or the softmax cross entropy loss.

FIG. 5 illustrates an example method 500 in accordance with the present application. In examples, some or all of the operations of method 500 are performed by one or more components of system 100. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the method 500 may be omitted, and in certain examples, other operations may be added.

At operation 501, the method may include pre-training a language model on hypertext data. For example, ML model 103 may be pre-trained on hypertext data (e.g., one or more HTML web pages), as discussed above.

At operation 502, the method may include fine-tuning the language model on a dataset associated with a classification task. For example, ML model 103 and/or output classifier 104 may be fine-tuned (e.g., trained) on hypertext data that includes elements for classification. The classification task may refer to classifying one or more elements (e.g., forms and/or fields) in input information 108. For example, the classification task may include determining whether a field or form is likely to be of a particular classification.

At operation 503, the method may include receiving input hypertext information that is included in a web page. For example, element detector 101 receives input information 108. Input information 108 may include hypertext information (e.g., web pages, HTML information, HTML pages, HTML documents). Input information 108 may include one or more hypertext elements (e.g., forms, fields).

At operation 504, the method may include identifying an element in the hypertext information that is relevant to the classification task. In some examples, the element is one of a form or a field on the web page. For example, element detector 101 may identify forms and fields in the hypertext information by searching for key words or phrases that correspond to elements that are desired to be classified (e.g., <form>, <input>). The elements desired to be classified may be pre-defined or pre-set at element detector 101. The elements desired to be classified may depend on the type of tool that is using the information (e.g., classification probability 114) output from system 100. For example, if the tool using the information output from system 100 is an autofiller tool, element detector 101 may search for forms and/or fields key words or phrases such as <form> and <input>.

At operation 505, the method may include generating a data tree representation of at least a portion of the hypertext information. For example, element detector 101, or another component, may generate a data tree representation of at least one identified element by element detector 101. For example, a data tree of a form may be generated, where the form includes one or more fields as nodes of the data tree.

At operation 506, the method may include generating a plurality of tokens that are based at least in part on the element. In some examples, the plurality of tokens comprises text tokens, positional tokens, and path tokens. In some examples, generating the plurality of tokens is based at least in part on the data tree representation. For example, element extractor 102 may generate text tokens 110, positional tokens 111, and/or path tokens 112. For example, text extractor 105 may generate text tokens 110, positional encoder may generate positional tokens 111, and path extractor 107 may generate path tokens 112. Text tokens 110 may be units of text including words, portions of words, letters, characters, phrases, symbols, or a combination of these, of the information in data tree(s) 109. Positional tokens 111 may represent each text token 110's absolute position in the sequence of text tokens 110. Path tokens 112 may be paths through data tree 109 or hypertext (e.g., HTML) page or document corresponding to the associated text token 110's position in the data tree 109.

At operation 507, the method may include generating, using an ML model, a plurality of contextualized vector representations that are based at least in part on the plurality of tokens. For example, ML model 103 generates vector representations 113 that are based on text tokens 110, positional tokens 111, and/or path tokens 112. Vector representations 113 may be contextualized by at least a portion of the web page (e.g., by text tokens 110, positional tokens 111, and/or path tokens 112). For example, a vector representation of a field may be contextualized by some or all of the form of which the field is included in. Vector representations 113 may be embeddings (e.g., HTML embeddings).

At operation 508, the method may include classifying, using the ML model, the element into a classification based at least in part on the plurality of contextualized vector representations. In some examples, classifying the element comprises generating a probability that the element is associated with the classification. For example, output classifier 104 classifies elements (e.g., elements may correspond to one or more vector representations) into a classification based on vector representations 113 by applying classifiers onto one or more of vector representations 113. In some examples, the applied classifiers include linear transformations. Applying the classifiers results in output classification probabilities 114 of the one or more vector representations 113 for one or more (e.g., each) classification.

At operation 509, the method may include autofilling a field on a web page based at least in part on the probability being greater than a threshold probability, wherein the field is associated with the element. For example, an autofiller tool may autofill a field on a web page based on classification probability 114 for the field being greater than a threshold likelihood percentage (e.g., the field being autofilled is the element that was classified. Classification probability 114 may indicate the probability that the element classified is the field being autofilled).

FIG. 6 illustrates an example method 600 in accordance with the present application. In examples, some or all of the operations of method 600 are performed by one or more components of system 100. It should be understood that the sequence of operations of the method is not fixed, but can be modified, changed in order, performed differently, performed sequentially, concurrently, or simultaneously, or altered into any desired sequence, as recognized by a person of skill in the art. In some examples, certain operations depicted in the method 600 may be omitted, and in certain examples, other operations may be added.

At operation 601, the ML model may be a language model, and the method may include pre-training the language model on hypertext data. For example, ML model 103 may be pre-trained on hypertext data (e.g., one or more HTML web pages).

At operation 602, the method may include fine-tuning the language model on a dataset associated with a classification task. For example, ML model 103 and/or output classifier 104 may be fine-tuned (e.g., trained) on hypertext data that includes elements for classification. The classification task may refer to classifying one or more elements (e.g., forms and/or fields) in input information 108. For example, the classification task may include determining whether a field or form is likely to be of a particular classification or another.

At operation 603, the method may include receiving a plurality of text tokens for an element of a web page. In some examples, the element is one of a form or a field on the web page. For example, ML model 103 may receive text tokens 110 from text extractor 105. Text tokens 110 may be units of text including words, portions of words, letters, characters, phrases, symbols, or a combination of these, of the information in data tree(s) 109.

At operation 604, the method may include receiving a plurality of positional tokens for the element of the web page. For example, ML model 103 may receive positional tokens 111 from positional encoder 106. Positional tokens 111 may represent each text token's absolute position in the sequence of text tokens 110.

At operation 605, the method may include receiving a plurality of path tokens for the element of the web page. For example, ML model 103 may receive path tokens 112 from path extractor 107. Path tokens 112 may be paths through data tree 109 or hypertext (e.g., HTML) page or document corresponding to the associated text token's position.

At operation 606, the method may include combining the plurality of text tokens, the plurality of positional tokens, and the plurality of path tokens into a plurality of combined tokens. For example, element extractor 102 may combine text tokens 110, positional tokens 111 and path tokens 112 to create a sequence of combined tokens.

At operation 607, the method may include generating, using an ML model, a plurality of contextualized vector representations based at least in part on the plurality of combined tokens. For example, ML model 103 generates vector representations 113 that are based on text tokens 110, positional tokens 111, and/or path tokens 112. Vector representations 113 may be contextualized by at least a portion of the web page (e.g., by text tokens 110, positional tokens 111, and/or path tokens 112). For example, a vector representation of field may be contextualized by some or all of the form of which the field is included in. Vector representations 113 may be embeddings (e.g., HTML embeddings).

At operation 608, the method may include classifying, using the ML model, the element into a classification based at least in part on the plurality of contextualized vector representations. In some examples, classifying the element comprises applying, at an output layer of the ML model, a classifier to a contextualized vector representation of the plurality of contextualized vector representations, and generating, at the output layer of the ML model, a probability that the contextualized vector representation is associated with the classification based at least in part on the applying. For example, output classifier 104 classifies elements (e.g., elements may correspond to one or more vector representations) into a classification based on vector representations 113 by applying classifiers onto one or more of vector representations 113. In some examples, the applied classifiers include linear transformations. Applying the classifiers results in output classification probabilities 114 of the one or more vector representations 113 for one or more (e.g., each) classification. In some examples, a type of the classifier applied is based at least in part on a type of the element.

At operation 609, the method may include autofilling a field on a web page based at least in part on the probability being greater than a threshold probability, wherein the field is associated with the element. For example, an autofiller tool may autofill a field on a web page based on classification probability 114 for the field being greater than a threshold likelihood percentage (e.g., the field being auto-filled is the element that was classified. Classification probability 114 may indicate the probability that the element classified is the field being autofilled).

Figure 7:
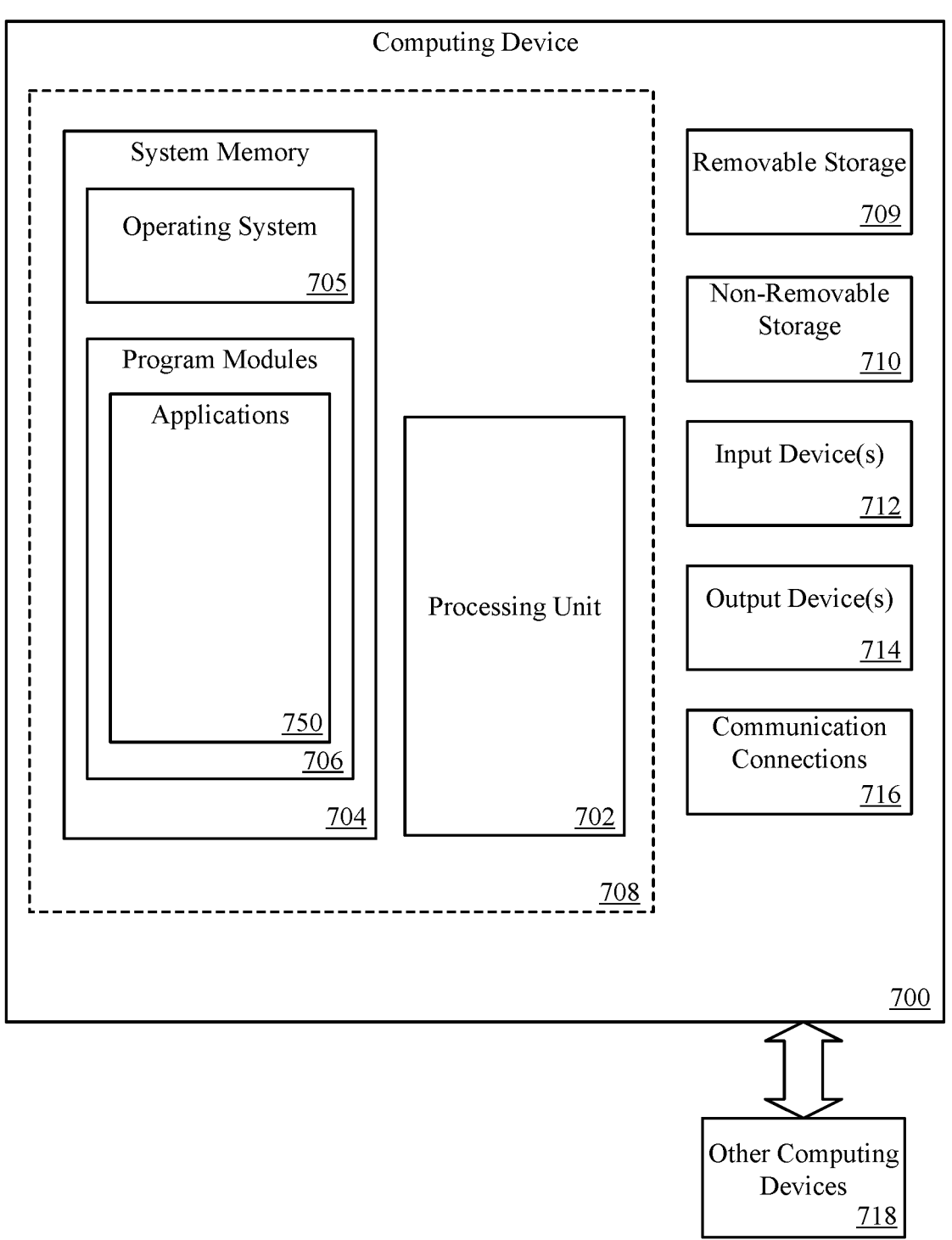
FIG. 7 is a block diagram depicting an example computing environment in which systems and methods of the present application may be implemented.

FIG. 7 is a block diagram illustrating physical components (i.e., hardware) of a computing device 700 with which examples of the present disclosure may be practiced. The computing device components described below may be suitable for a customer device implanting one or more of element detector 101, element extractor 102, ML model 103, output classifier 104, text extractor 105, positional encoder 106, path extractor 107, or other components of FIGS. 1-2. In a basic configuration, the computing device 700 may include at least one processing unit 702 and a system memory 704. The processing unit(s) (e.g., processors) may be referred to as a processing system. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750 to implement one or more of the systems described above with respect to FIGS. 1-2.

The operating system 705, for example, may be suitable for controlling the operation of the computing device 700. Furthermore, aspects of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (re-movable and/or non-removable) such as, for example, mag-netic disks, optical disks, solid state drives, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the operations of the methods illustrated in FIGS. 5-6. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be prac-ticed via a system-on-a-chip (SOC) where each or many of the components illustrated in FIG. 7 may be integrated onto a single integrated circuit. Such an SOC device may include one or more processing units, graphics units, communica-tions units, system virtualization units and various applica-tion functionality all of which are integrated (or "burned") onto the chip substrate as a single integrated circuit. When operating via an SOC, the functionality, described herein, with respect to generating suggested queries, may be oper-ated via application-specific logic integrated with other components of the computing device 700 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allow-ing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The sys-tem memory 704, the removable storage device 709, and the non-removable storage device 710 are all computer storage media examples (i.e., memory storage.) Computer storage media may include RAM, ROM, electrically erasable pro-grammable read-only memory (EEPROM), flash memory or other memory technology, CD-ROM, digital versatile disks (DVD) or other optical storage, magnetic cassettes, mag-netic tape, magnetic disk storage or other magnetic storage devices, or any other article of manufacture which can be used to store information and which can be accessed by the computing device 700. Any such computer storage media may be part of the computing device 700. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communi-cation media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concur-rently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving input hypertext information that is included in a web page;
identifying an element in the hypertext information that is relevant to a classification task;
generating a data tree representation of at least a portion of the hypertext information;
generating a plurality of tokens that are based at least in part on the element, wherein generating the plurality of tokens is based at least in part on the data tree representation;
generating, using a machine learning (ML) model, a plurality of contextualized vector representations that are based at least in part on the plurality of tokens; and
classifying, using the ML model, the element into a classification based at least in part on the plurality of contextualized vector representations.

2. The method of claim 1, wherein the ML model is a language model, the method further comprising:
pre-training the language model on hypertext data; and
fine-tuning the language model on a dataset associated with the classification task.

3. The method of claim 1, wherein the plurality of tokens comprises text tokens, positional tokens, and path tokens.

4. The method of claim 1, wherein classifying the element comprises generating a probability that the element is associated with the classification.

5. The method of claim 4, further comprising:
autofilling a field on a web page based at least in part on the probability being greater than a threshold probability, wherein the field is associated with the element.

6. The method of claim 1, wherein the element is one of a form or a field on the web page.

7. A method, comprising:
receiving a plurality of text tokens for an element of a web page;
receiving a plurality of positional tokens for the element of the web page;
receiving a plurality of path tokens for the element of the web page, wherein the plurality of path tokens each comprises a path expression indicating a position of a corresponding text token in a data tree representation of at least a portion of the web page;
combining the plurality of text tokens, the plurality of positional tokens, and the plurality of path tokens into a plurality of combined tokens;
generating, using a machine learning (ML) model, a plurality of contextualized vector representations based at least in part on the plurality of combined tokens; and
classifying, using the ML model, the element into a classification based at least in part on the plurality of contextualized vector representations.

8. The method of claim 7, wherein classifying the element comprises applying, at an output layer of the ML model, a classifier to a contextualized vector representation of the plurality of contextualized vector representations, and generating, at the output layer of the ML model, a probability that the contextualized vector representation is associated with the classification based at least in part on the applying.

9. The method of claim 8, wherein a type of the classifier applied is based at least in part on a type of the element.

10. The method of claim 8, further comprising:
autofilling a field on a web page based at least in part on the probability being greater than a threshold probability, wherein the field is associated with the element.

11. The method of claim 7, wherein the ML model is a language model, the method further comprising:
pre-training the language model on hypertext data; and
fine-tuning the language model on a dataset associated with the classification task.

12. The method of claim 7, wherein the element is one of a form or a field on the web page.

13. A system comprising:
a processor; and
memory comprising executable instructions that when executed, perform operations, the operations comprising:
receiving input hypertext information that is included in a web page;
identifying an element in the hypertext information that is relevant to a classification task;
generating a plurality of tokens that are based at least in part on the element;
generating, using a machine learning (ML) model, a plurality of contextualized vector representations that are based at least in part on the plurality of tokens, wherein a number of the plurality of contextualized vector representations is the same as a number of the plurality of tokens, and wherein each contextualized vector representation corresponds to a respective token; and
classifying, using the ML model, the element into a classification based at least in part on the plurality of contextualized vector representations.

14. The system of claim 13, wherein the ML model is a language model, the operations further comprising:
pre-training the language model on hypertext data; and
fine-tuning the language model on a dataset associated with the classification task.

15. The system of claim 13, the operations further comprising:
generating a data tree representation of at least a portion of the hypertext information, wherein generating the plurality of tokens is based at least in part on the data tree representation.

16. The system of claim 13, wherein the plurality of tokens comprises text tokens, positional tokens, and path tokens.

17. The system of claim 13, wherein classifying the element comprises generating a probability that the element is associated with the classification.

18. The system of claim 17, the operations further comprising:

autofilling a field on a web page based at least in part on the probability being greater than a threshold probability, wherein the field is associated with the element.

19. The system of claim 13, wherein the element is one of a form or a field on the web page.

* * * * *